United States Patent
Asahara

[11] Patent Number: 5,945,051
[45] Date of Patent: Aug. 31, 1999

[54] PROCESS FOR PRODUCING POROUS BODY OF TOURMALINE

[75] Inventor: Takaaki Asahara, Matsudo, Japan

[73] Assignee: Tako Chemi-Tech Inc., Tokyo, Japan

[21] Appl. No.: 09/007,643

[22] Filed: Jan. 15, 1998

[51] Int. Cl.$^6$ ................................. B27J 5/00; B29C 67/00
[52] U.S. Cl. ......................... 264/126; 264/125; 264/127; 521/85; 521/91; 521/92; 521/142; 521/60
[58] Field of Search ..................................... 264/125, 126, 264/127; 521/85, 91, 92, 142, 60

[56] References Cited

U.S. PATENT DOCUMENTS

| 3,635,821 | 1/1972 | Treadwell | 521/76 |
| 5,559,170 | 9/1996 | Castle | 523/223 |

*Primary Examiner*—Morton Foelak
*Attorney, Agent, or Firm*—Fish & Richardson P.C.

[57] ABSTRACT

A process for producing a porous body of tourmaline includes the step of sintering a mixture of fine powder of tourmaline and fine powder of polyethylene or fine powder of polypropylene.

2 Claims, 1 Drawing Sheet

PROCESS FOR PRODUCING POROUS BODY OF TOURMALINE

BACKGROUND OF THE INVENTION

1. Field of the Invention

This invention relates to a process for producing a porous body of tourmaline that enables the tourmaline to thoroughly manifest its ionizing effect.

2. Prior Art Statement

Tourmaline has to be used in the form of a fine powder to take advantage of its ionizing effect. Finely comminuted tourmaline is, however, difficult to use "as is" in either water or air. The ordinary practice has therefore been to sinter it with a ceramic. The magnitude of the ionizing effect produced by tourmaline is proportional to the area thereof in contact with water or air. Products produced by the prior art are therefore inefficient because they can utilize only the very small percentage of the tourmaline exposed at the surface. Moreover, the sintering of the mixture of tourmaline and ceramic requires high-temperature heating. This makes production difficult because tourmaline loses its useful electrical properties when heated to a high temperature of, for example, 950 C or higher.

SUMMARY OF THE INVENTION

An object of this invention is to provide a process that can produce a porous body of tourmaline offering a large area of contact between the tourmaline and water or air for its size, thereby enabling the tourmaline to thoroughly manifest its ionizing effect, and that can readily produce the porous body at high yield.

Since the ionizing effect of fine powder of tourmaline increases in proportion as its area in contact with water or air increases, an attempt to increase the ionizing efficiency of a body of tourmaline of a given size requires that the body be structured to enable the water or air to make contact with the tourmaline fine powder not only at its surface but also at its interior. This can be achieved by making the body of tourmaline porous so that water or air can infiltrate to the interior of the body. By this, a much greater area of contact with the water or air can be obtained than is obtainable by a conventional body of the same size.

To achieve the aforesaid object, this invention therefore provides a process for producing a porous body of tourmaline comprising the step of sintering a mixture of fine powder of tourmaline and fine powder of polyethylene or fine powder of polypropylene.

When the porous body of tourmaline is formed by sintering using fine powder of polyethylene or fine powder of polypropylene as a carrier for the fine powder of tourmaline, the sintering can be conducted at a temperature that is 400 C. lower than that in the process of the prior art. The porous body of tourmaline can therefore be produced without degrading the electrical performance of the tourmaline.

BRIEF DESCRIPTION OF THE DRAWING

The sole FIGURE is an enlarged sectional view showing a porous body of tourmaline produced by the process of the invention.

DESCRIPTION OF THE PREFERRED EMBODIMENTS

Figure 1:
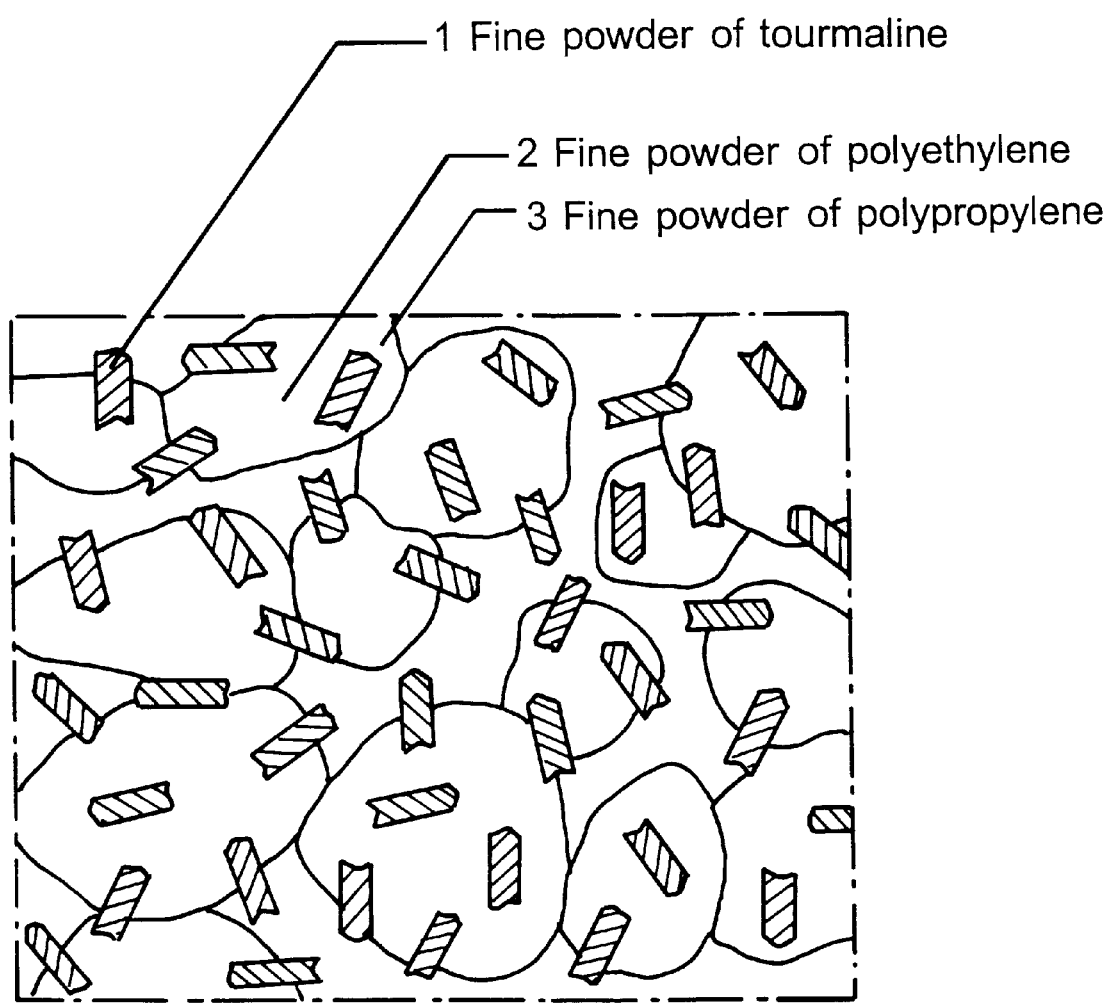

FIG. 1 shows an enlarged section of a porous body of tourmaline according to the invention. While the process can use either fine powder of polyethylene or fine powder of polypropylene, only one example is shown in the drawing because the resulting particle patterns are substantially identical.

Tourmaline was comminuted to different degrees of fineness. It was found that the no matter how fine the particles became, they maintained their electrical property and each crystal possessed a pair of electrodes. Tourmaline comminuted to the finest degree possible was mixed with fine powder of polyethylene exhibiting high electrical resistance. The mixed powder was then sintered at a temperature under 550 C. to obtain a porous body of tourmaline having the sectional configuration shown in the drawing. As shown, the porous body included fine particles of polyethylene 2, fine particles of tourmaline 1 partially embedded in the polyethylene particles, and numerous voids (pores) among the polyethylene particles. Owing to the discrete separation of the tourmaline crystal electrodes, the tourmaline was able to thoroughly manifest its ionizing effect, while this effect was enhanced still further since water or air was able to permeate into the interior of the body owing to its porous internal structure.

Another porous body of tourmaline was produced in the same way as described in the foregoing except that fine powder of polypropylene (designated by reference numeral 3 in the drawing) was used in place of fine powder of polyethylene. The porous body obtained exhibited substantially the same properties as that obtained by use of fine powder of polyethylene.

The porous body of tourmaline according to this invention offers several tens to several hundreds of times more contact area to water and air than does the conventional nonporous tourmaline body. Since the ionizing effect of the tourmaline is proportionally greater, the porous body of tourmaline produced by the method of this invention is highly efficient. Moreover, as the use of polyethylene or polyproplylene enables the sintering temperature to be lowered 400 C. or more relative to the conventional process, the porous body can be readily produced at high yield without degrading the electrical properties of the tourmaline.

What is claimed is:

1. A process for producing a porous body of tourmaline comprising the step of sintering a mixture of fine powder of tourmaline and fine powder of polyethylene or fine powder of polypropylene.

2. A process according to claim 1, wherein the sintering is effected at a temperature not exceeding 550 C.

* * * * *